(12) United States Patent
Uemura

(10) Patent No.: US 8,761,670 B2
(45) Date of Patent: Jun. 24, 2014

(54) COMMUNICATION APPARATUS, METHOD FOR CONTROLLING COMMUNICATION APPARATUS, AND PROGRAM

(75) Inventor: Hidetaka Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 13/000,558

(22) PCT Filed: Jun. 4, 2009

(86) PCT No.: PCT/JP2009/002525
§ 371 (c)(1),
(2), (4) Date: Dec. 21, 2010

(87) PCT Pub. No.: WO2009/157141
PCT Pub. Date: Dec. 30, 2009

(65) Prior Publication Data
US 2011/0105021 A1 May 5, 2011

(30) Foreign Application Priority Data
Jun. 23, 2008 (JP) ................. 2008-163638

(51) Int. Cl.
*H04B 5/00* (2006.01)
*H04B 7/00* (2006.01)
(52) U.S. Cl.
USPC ......... 455/41.2; 455/41.1; 455/41.3; 455/566
(58) Field of Classification Search
USPC ................ 455/41.1, 41.2, 41.3, 566
See application file for complete search history.

(56) References Cited

U.S. PATENT DOCUMENTS

| | | | |
|---|---|---|---|
| 8,351,893 B2 * | 1/2013 | Ylitalo ...................... 455/404.1 |
| 2004/0109063 A1 * | 6/2004 | Kusaka et al. ............. 348/207.1 |
| 2004/0259590 A1 * | 12/2004 | Middleton ................. 455/556.1 |
| 2005/0001902 A1 * | 1/2005 | Brogan et al. ............. 348/207.1 |
| 2005/0064814 A1 | 3/2005 | Matsuo et al. |
| 2005/0107032 A1 | 5/2005 | Homma et al. |
| 2006/0194541 A1 * | 8/2006 | Rekimoto et al. ........... 455/41.3 |
| 2006/0245415 A1 * | 11/2006 | Krasnansky .................. 370/352 |
| 2007/0149124 A1 * | 6/2007 | Onozawa ..................... 455/41.2 |
| 2008/0068225 A1 * | 3/2008 | Wahlstrom ...................... 341/22 |
| 2009/0089676 A1 * | 4/2009 | Finkelstein et al. .......... 715/719 |
| 2009/0313354 A1 * | 12/2009 | Sjoerd ........................... 709/219 |
| 2010/0030860 A1 * | 2/2010 | Iwasawa et al. ............. 709/206 |

FOREIGN PATENT DOCUMENTS

| | | |
|---|---|---|
| JP | 7-141537 A | 6/1995 |
| JP | 2005-045557 A | 2/2005 |
| JP | 2005-151258 A | 6/2005 |
| JP | 2007-150921 A | 6/2007 |
| WO | 2007-063922 A1 | 6/2007 |

* cited by examiner

*Primary Examiner* — Wen Huang
(74) *Attorney, Agent, or Firm* — Canon U.S.A., Inc. IP Division

(57) ABSTRACT

In a communication apparatus including a close proximity wireless communication unit configured to perform communication when the communication apparatus and an external apparatus are brought into close proximity with each other within a predetermined range, selection of a communication process is performed. Information on a plurality of operating units and information on communication processes to be performed by the communication apparatus are stored in association with each other. Control is performed in such a manner that a communication process that is associated with one of the plurality of operating units that is being operated when communication with the external apparatus is established is performed.

23 Claims, 10 Drawing Sheets

| OPERATION BUTTON | OPERATION |
|---|---|
| PHOTO BUTTON | RECEIVE ALL STILL IMAGE DATA |
| REC BUTTON | RECEIVE ALL MOVIE DATA |
| ZOOM TELE OPERATION | RECEIVE SELECTED STILL IMAGE DATA |
| ZOOM WIDE OPERATION | RECEIVE SELECTED MOVIE DATA |
| DIRECT PRINT BUTTON | TRANSMIT ALL STILL IMAGE DATA |
| PLAY (PLAYBACK) BUTTON | TRANSMIT ALL MOVIE DATA |
| REW (REWIND) BUTTON | TRANSMIT SELECTED STILL IMAGE DATA |
| FF (FAST-FORWARD) BUTTON | TRANSMIT SELECTED MOVIE DATA |

Fig. 5

| OPERATION BUTTON | OPERATION |
|---|---|
| PHOTO BUTTON | RECEIVE ALL STILL IMAGE DATA |
| REC BUTTON | RECEIVE ALL MOVIE DATA |
| ZOOM TELE OPERATION | RECEIVE SELECTED STILL IMAGE DATA |
| ZOOM WIDE OPERATION | RECEIVE SELECTED MOVIE DATA |
| DIRECT PRINT BUTTON | TRANSMIT ALL STILL IMAGE DATA |
| PLAY (PLAYBACK) BUTTON | TRANSMIT ALL MOVIE DATA |
| REW (REWIND) BUTTON | TRANSMIT SELECTED STILL IMAGE DATA |
| FF (FAST-FORWARD) BUTTON | TRANSMIT SELECTED MOVIE DATA |

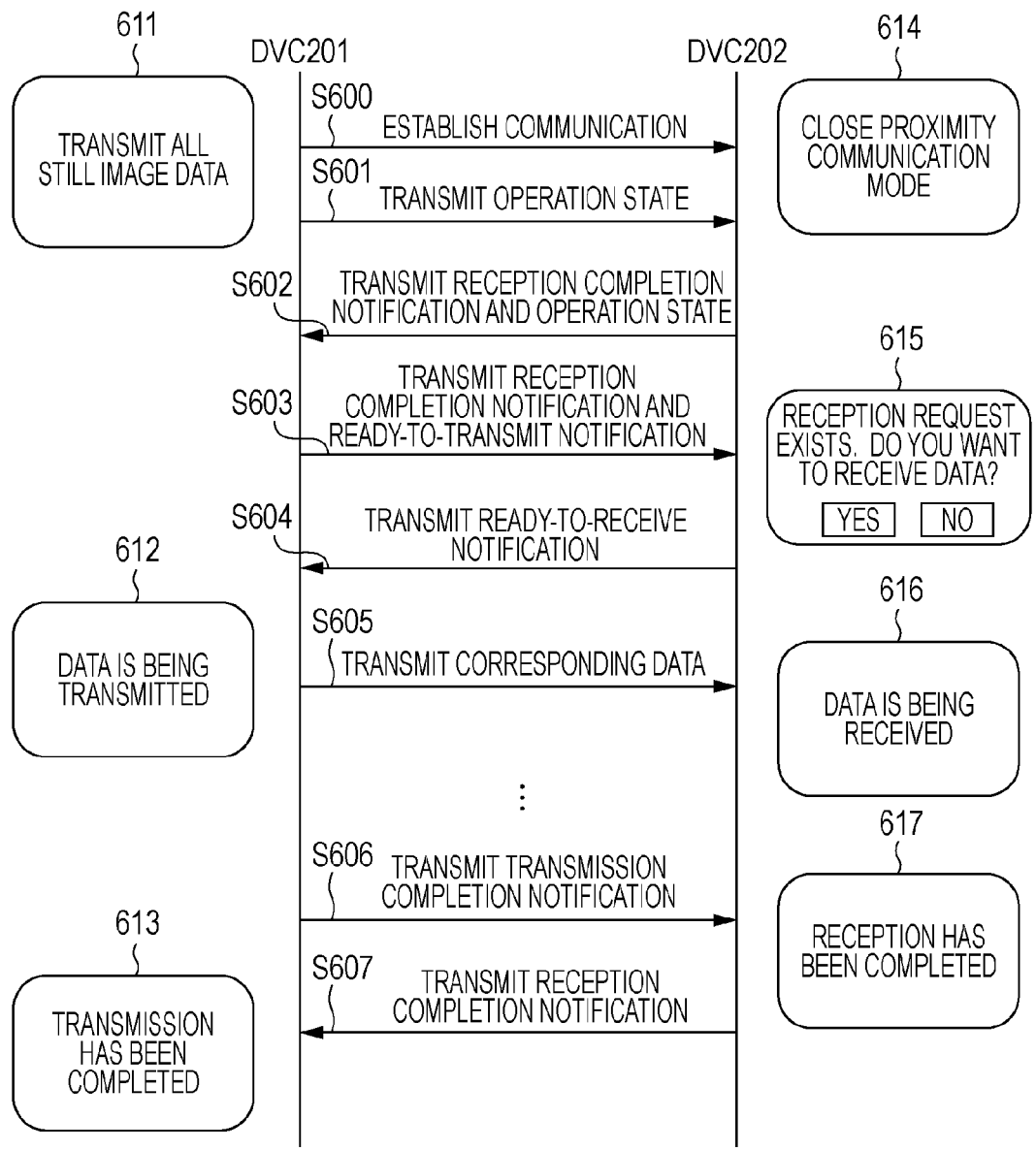

COMMUNICATION APPARATUS, METHOD FOR CONTROLLING COMMUNICATION APPARATUS, AND PROGRAM

TECHNICAL FIELD

The present invention relates to a system in which apparatuses are brought into close proximity with each other so that communication is established and data is transmitted and received, and more particularly, to a technique for facilitating data transmission and reception.

BACKGROUND ART

In recent years, systems in which close proximity wireless communication is performed, by using an induction field or the like, within a communicable range of from several centimeters to several tens of centimeters have been developed. Such systems are dedicated to close proximity wireless communications with a high transfer speed, and are not likely to affect other wireless systems. In addition, such systems are suitable for data communications that do not involve cable connection between apparatuses.

For example, a technique in which when a card containing an antenna is brought into close proximity with an apparatus, information on the card is transmitted, in a wireless manner, to the apparatus is known (for example, see Patent Citation 1).

Nowadays, a technique in which data communications are performed not only when a card is brought into close proximity with an apparatus but also when a communication terminal such as a cellular phone is brought into close proximity with an apparatus is also known.

However, in the above-described techniques for close proximity wireless communication, mainly, simple operations, such as bringing an apparatus into close proximity with an external apparatus and bringing the apparatus away from the external apparatus, are performed. Thus, it is difficult to perform detailed operations, such as selecting a communication method.

Patent Citation 1: Japanese Patent Laid-Open No. 7-141537

DISCLOSURE OF INVENTION

The present invention is directed to overcome the above-described drawbacks and disadvantages.

The present invention is also directed to improve user-friendliness.

According to an aspect of the present invention, there is provided a communication apparatus including a close proximity wireless communication unit configured to perform non-contact communication when the communication apparatus and an external apparatus are brought into close proximity with each other within a predetermined range; a plurality of operating units; a storing unit configured to store information on the plurality of operating units and information on communication processes to be performed by the communication apparatus, in association with each other; and a control unit configured to control the close proximity wireless communication unit to perform, in a case where communication with the external apparatus is established while one of the plurality of operating units of the communication apparatus is being operated, a communication process that is associated with the one of the plurality of operating units of the communication apparatus that is being operated when communication with the external apparatus is established.

According to another aspect of the present invention, there is provided a method for controlling a communication apparatus including the steps of performing close proximity wireless communication when the communication apparatus and an external apparatus are brought into close proximity with each other within a predetermined range; storing information on a plurality of operating units included in the communication apparatus and information on communication processes to be performed through the close proximity wireless communication, in association with each other; and performing, in a case where communication with the external apparatus is established while one of the plurality of operating units of the communication apparatus is being operated, a communication process that is associated with the one of the plurality of operating units of the communication apparatus that is being operated when communication with the external apparatus is established.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

FIG. 5 is an illustration showing the correspondences between operation buttons and communication processes in a DVC according to the first embodiment.

FIG. 6 is a sequence diagram showing a process performed by DVCs according to the first embodiment.

DESCRIPTION OF EMBODIMENTS

Exemplary embodiments, features and aspects of the present invention will now be described in detail below with reference to the attached drawings.

First Embodiment

Hereinafter, an embodiment in which the present invention is applied to a system including a digital video camera (hereinafter, referred to as a "DVC"), which is an example of an image capturing apparatus, will be described.

Figure 1:
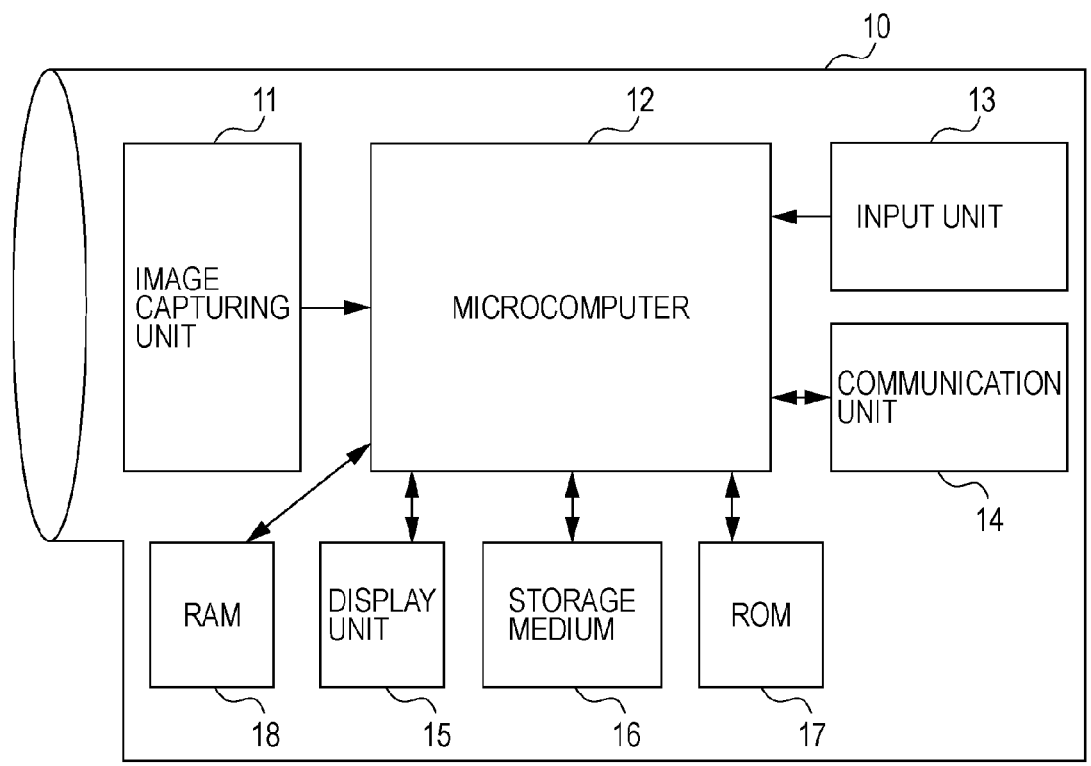
FIG. 1 is a block diagram of a digital video camera (DVC) according to a first embodiment.

FIG. 1 is a block diagram showing a DVC according to an embodiment of the present invention. A DVC 10 includes an image capturing unit 11 configured to capture an image of an object. The image capturing unit 11 includes a lens, a sensor, and the like. An image of an object captured by the image capturing unit 11 is subjected to image processing, and image data is thus obtained.

A microcomputer 12 controls the entire DVC 10 in accordance with signals received from units of the DVC 10 and a program. The microcomputer 12 may control the entire DVC 10 by using a single piece of hardware. Alternatively, the microcomputer 12 may realize control of the entire DVC 10 by functioning as a single control unit while a plurality of pieces of hardware share processes.

An input unit 13 is constituted by operating members for receiving operations from a user. The input unit 13 may include, for example, a button, a lever, a touch sensor, and a rotating wheel. The input unit 13 according to this embodiment includes a Power button used for turning on and off the power, a Photo button used for issuing an instruction to capture a still image, a Rec button used for issuing an instruction to capture a movie, a Zoom key used for performing zooming, and the like. Furthermore, the input unit 13 also includes a Direct Print button used for issuing an instruction to print a captured image, a Play (playback) button used for issuing an instruction to play back a captured image, a Rew (rewind) button used for rewinding captured movies, an FF (fast-forward) button used for fast-forwarding captured movies, and the like.

A communication unit 14 is a communication interface used for performing close proximity wireless communication. The communication unit 14 contains an antenna. When the communication unit 14 is brought into close proximity with a communication unit of an external apparatus, non-contact communication is started.

A display unit 15 is a member on which captured images and various graphical user interfaces (GUIs) are displayed. The display unit 15 is, for example, a liquid crystal display.

A storage medium 16 is a medium on which captured images are stored. The storage medium 16 may be contained in the DVC 10. Alternatively, the storage medium 16 may be a removable memory card or the like.

A read-only memory (ROM) 17 is a memory in which control set values and a program are stored.

A random-access memory (RAM) 18 is a memory in which parameters and the like are temporarily stored.

The DVC 10 has the configuration described above. In this embodiment, a case where DVCs perform data transmission and reception through close proximity wireless communication will be explained by way of example.

Figure 2:
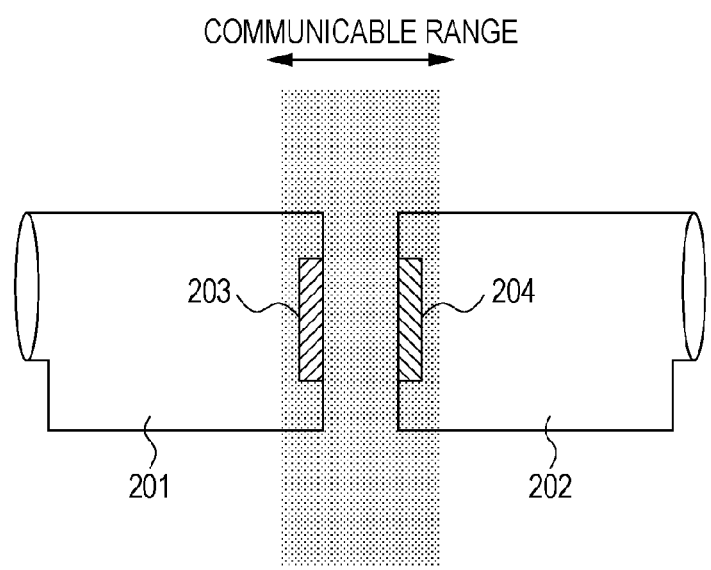
FIG. 2 illustrates an overview of close proximity wireless communication according to the first embodiment.

FIG. 2 illustrates an overview of close proximity wireless communication performed between a DVC 201 and a DVC 202. Close proximity wireless communication is implemented when apparatuses are brought into close proximity with each other within a predetermined communicable range. In general, a communicable range is narrow, such as from several centimeters to several tens of centimeters, even though it depends on the frequency band. When a communication unit 203 of the DVC 201 and a communication unit 204 of the DVC 202 are brought into close proximity with each other within a predetermined range, induced electromotive force is generated. When detecting the electromotive force, the DVC 201 and the DVC 202 start a process to establish communication between the DVC 201 and the DVC 202. On the other hand, when the communication unit 203 and the communication unit 204 are brought away from each other beyond the communicable range, since sufficient electromotive force is not generated, communication between the DVC 201 and the DVC 202 is not established.

A DVC according to this embodiment is capable of being shifted to a plurality of states in a series of data communication processes. Hereinafter, the transition of the status of a DVC will be explained.

Communication between the DVC 201 and the DVC 202 shown in FIG. 2 will be considered by way of example. In this example, data is transmitted from the DVC 202 to the DVC 201.

Figure 3:
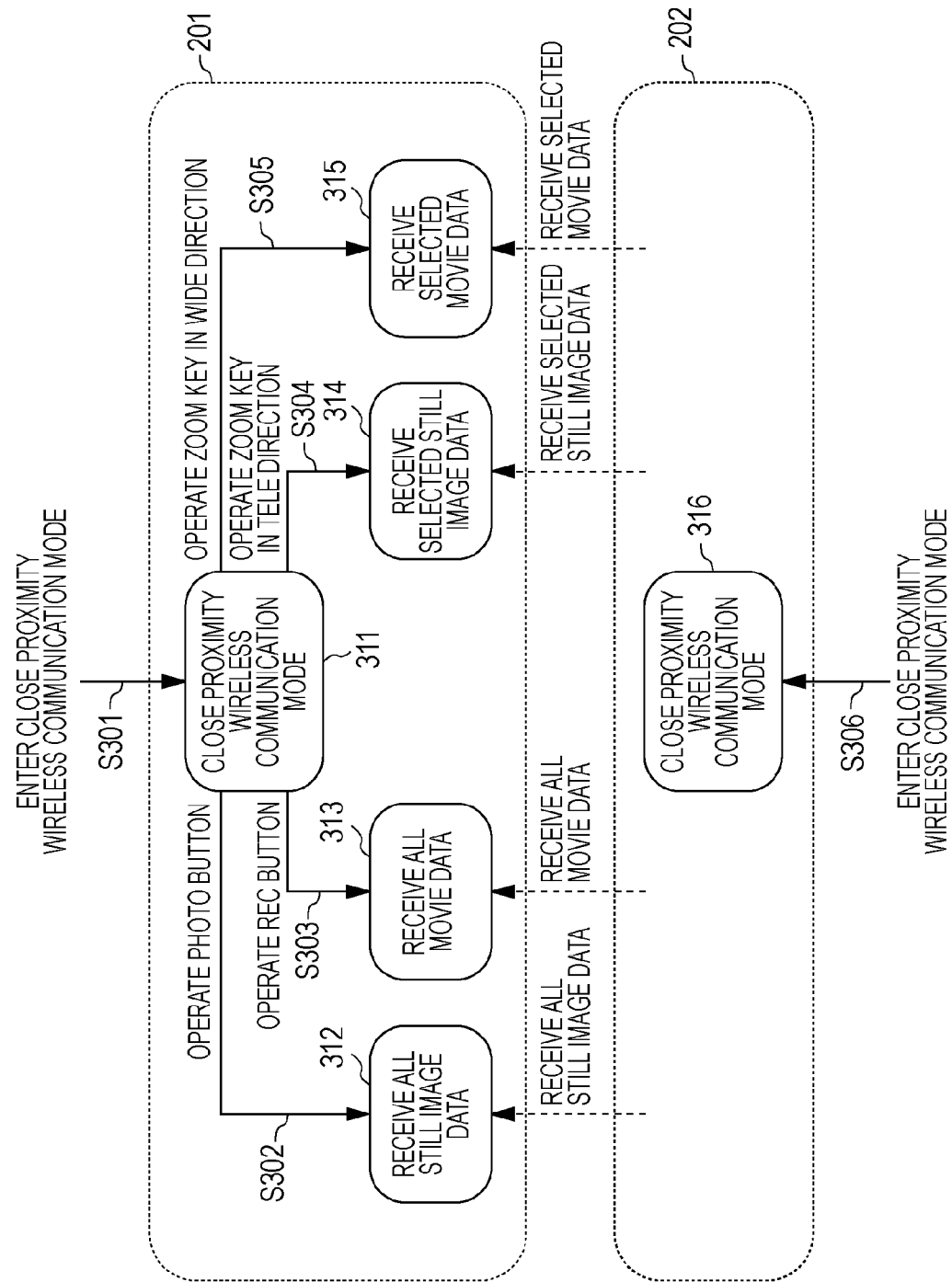
FIG. 3 illustrates the transition of the states of DVCs according to the first embodiment.
Figure 4:
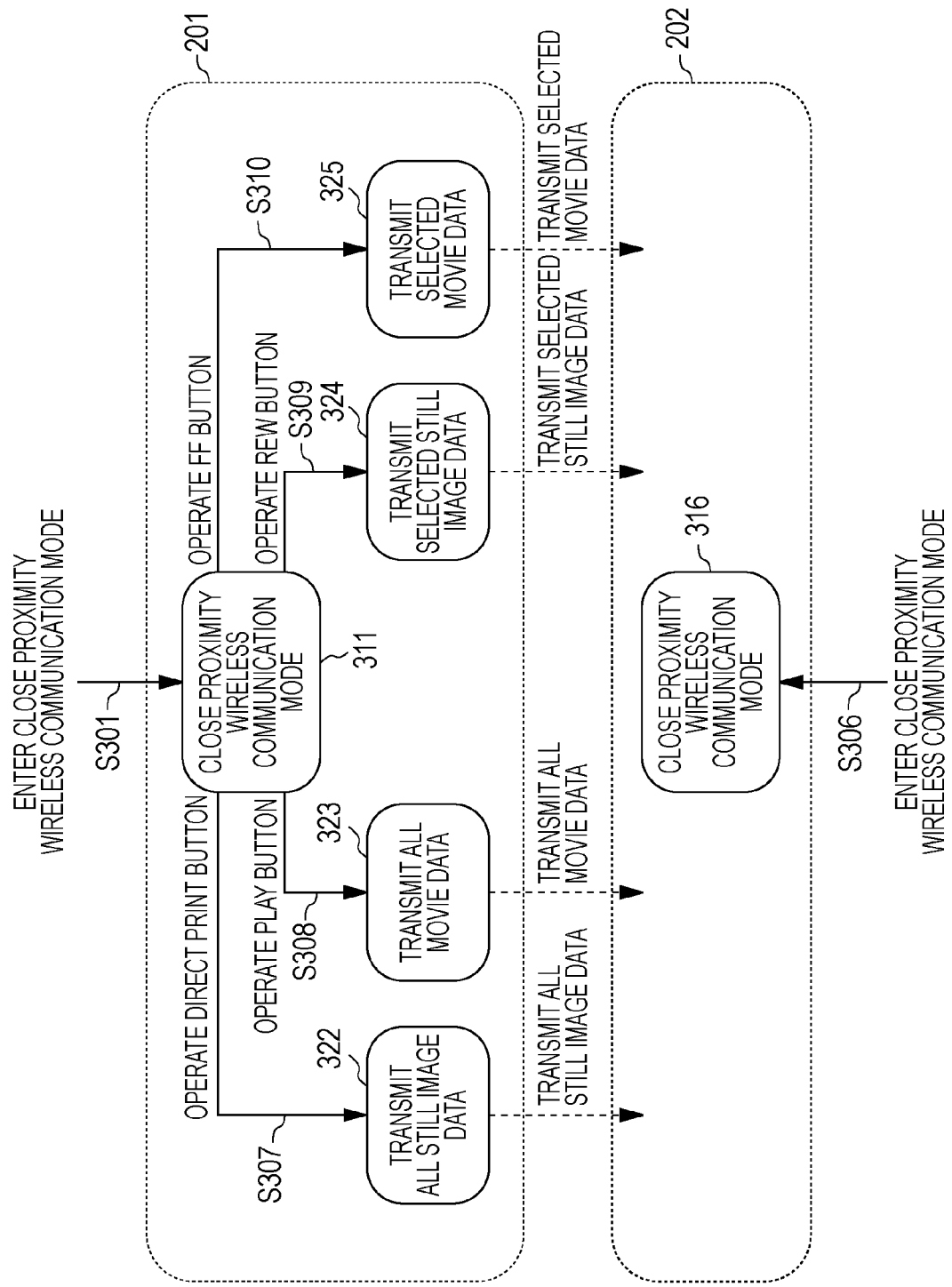
FIG. 4 illustrates the transition of the states of the DVCs according to the first embodiment.

FIGS. 3 and 4 each illustrate the transition of the statuses of the DVC 201 and the DVC 202 according to this embodiment. In step S301, the DVC 201 enters a close proximity wireless communication mode in accordance with a user operation. Note that the DVC 201 may automatically enter the close proximity wireless communication mode when the DVC 201 is changed from a power-off state to a power-on state.

When transition to the close proximity wireless communication mode is completed, a close proximity wireless communication mode screen 311 is displayed. This state is a basic state in close proximity wireless communication.

As in the DVC 201, the DVC 202 enters the close proximity wireless communication mode in step S306, and a close proximity wireless communication mode screen 316 is displayed.

Here, users of the DVC 201 and the DVC 202 need to issue instructions indicating, for example, whether an image is to be transmitted or received, whether a target is a still image or a movie, and whether a target is all the images or only a selected image.

A DVC according to this embodiment stores information on the operating members included in the input unit 13 and information on communication processes to be performed in communication, in association with each other. The term "communication process" refers to, for example, data reception and transmission. The detailed examples of communication processes will be described later.

A DVC performs a communication process associated with an operating member that is being operated at the time of establishment of communication with an external apparatus. Accordingly, by bringing the DVC into close proximity with the external apparatus while operating a particular operating member (for example, while pressing a button), a user of the DVC is able to cause the DVC to perform a desired communication process.

FIG. 5 shows the correspondences between operating members and communication processes. A DVC stores the correspondences shown in FIG. 5 in the ROM 17.

Pressing a Photo button is associated with a process for receiving all the still images. In the process for receiving all the still images, all the still image data stored in an external apparatus are received.

Pressing a Rec button is associated with a process for receiving all the movies. In the process for receiving all the movies, all the movie data stored in an external apparatus are received.

Operating a Zoom key in a Tele direction is associated with a process for receiving selected still image data. In the process for receiving selected still image data, a still image selected by an external apparatus from among still image data stored in the external apparatus is received.

Operating the Zoom key in a Wide direction is associated with a process for receiving selected movie data. In the process for receiving selected movie data, a movie selected by an external apparatus from among movie data stored in the external apparatus is received.

Pressing a Direct Print button is associated with a process for transmitting all the still image data. In the process for transmitting all the still image data, all the still image data stored in the DVC are transmit.

Pressing a Play (playback) button is associated with a process for transmitting all the movie data. In the process for transmitting all the movie data, all the movie data stored in the DVC are transmitted.

Pressing a Rew (rewind) button is associated with a process for transmitting selected still image data. In the process for transmitting selected still image data, a still image selected from among still image data stored in the DVC is transmitted.

Pressing an FF (fast-forward) button is associated with a process for transmitting selected movie data. In the process for transmitting selected movie data, a movie selected from among movie data stored in the DVC is transmitted.

Hereinafter, cases where operating members associated with different communication processes are operated in the close proximity wireless communication mode will be described. First, a case where the DVC 201 receives data from the DVC 202 will be explained with reference to FIG. 3.

A case where a user of the DVC 201 wants to cause the DVC 201 to receive all the still images stored in the DVC 202 will be explained.

In this case, in step S302, the user of the DVC 201 presses the Photo button of the DVC 201. In response to the pressing of the Photo button by the user, the DVC 201 displays, on the display unit 15, a screen 312 indicating that pressing the Photo button is associated with a process for receiving all the still image data.

When the DVC 201 and the DVC 202 are brought into close proximity with each other while the above-described operation is being performed (while the Photo button is kept pressed), close proximity wireless communication is established. The DVC 202 determines, in accordance with the operation state of the DVC 201, that the DVC 201 intends to perform the process for receiving all the still image data, and performs a process for transmitting all the still image data. That is, the DVC 202 transmits all the still image data to the DVC 201, and the DVC 201 receives still images.

Here, in a case where no still image is recorded in the DVC 202, the DVC 202 does not perform a transmission process. In this case, the DVC 202 may display, for the user, a warning indicating that no still image is recorded in the DVC 202.

A case where the user of the DVC 201 wants to cause the DVC 201 to receive all the movies stored in the DVC 202 will be explained.

In this case, in step S303, the user of the DVC 201 presses the Rec button of the DVC 201. In response to the pressing of the Rec button by the user, the DVC 201 displays, on the display unit 15, a screen 313 indicating that pressing the Rec button is associated with a process for receiving all the movie data.

When the DVC 201 and the DVC 202 are brought into close proximity with each other while the above-described operation is being performed (while the Rec button is kept pressed) on the DVC 201 side, close proximity wireless communication is established. The DVC 202 determines, in accordance with the operation state of the DVC 201, that the DVC 201 intends to perform the process for receiving all the movie data, and performs a process for transmitting all the movie data. That is, the DVC 202 transmits all the movie data to the DVC 201, and the DVC 201 receives movies.

Here, in a case where no chapter of a movie is recorded in the DVC 202, the DVC 202 does not perform a transmission process. In this case, the DVC 202 may display, for the user, a warning indicating that no movie is recorded in the DVC 202.

A case where the user of the DVC 201 wants to cause the DVC 201 to receive a still image selected from among still images stored in the DVC 202 will be explained.

First, a method for selecting an image to be transmitted will be explained. Prior to starting of communication with the DVC 201, a user of the DVC 202 is able to select in advance an image to be transmitted. For example, the DVC 202 displays a list of images on the display unit 15, so that the user of the DVC 202 can select a desired image. When selection of a desired image is completed, the DVC 202 makes a list of identification information including the file name of the selected image, and stores the list in the ROM 17. Accordingly, the user of the DVC 202 is able to select in advance an image to be transmitted.

Referring back to FIG. 3, in step S304, the user of the DVC 201 operates the Zoom key in the Tele direction. In response to the operation of the Zoom key in the Tele direction by the user, the DVC 201 displays, on the display unit 15, a screen 314 indicating that operating the Zoom key in the Tele direction is associated with a process for receiving selected still image data.

When the DVC 201 and the DVC 202 are brought into close proximity with each other while the above-described operation is being performed on the DVC 201 side, close proximity wireless communication is established. The DVC 202 determines, in accordance with the operation state of the DVC 201, that the DVC 201 intends to perform the process for receiving selected still image data, and performs a process for transmitting selected still image data. More specifically, the DVC 202 reads an image from the storage medium 16 by referring to a list of still images to be transmitted stored in the DVC 202, and transmits the read image to the DVC 201. Then, the DVC 201 receives the still image.

In a case where no still image has been selected, the DVC 202 does not perform a transmission process. In this case, the DVC 202 may display, for the user, a warning indicating that no still image has been selected.

A case where the user of the DVC 201 wants to cause the DVC 201 to receive a movie selected from among movies stored in the DVC 202 will be explained. A method for selecting a movie to be transmitted is similar to the method for selecting a still image to be transmitted.

In step S305, the user of the DVC 201 operates the Zoom key in the Wide direction. In response to the operation of the Zoom key in the Wide direction by the user, the DVC 201 displays, on the display unit 15, a screen 315 indicating that operating the Zoom key in the Wide direction is associated with a process for receiving selected movie data.

When the DVC 201 and the DVC 202 are brought into close proximity with each other while the above-described operation is being performed on the DVC 201 side, close proximity wireless communication is established. The DVC 202 determines, in accordance with the operation state of the DVC 201, that the DVC 201 intends to perform the process for receiving selected movie data, and performs a process for transmitting selected movie data. More specifically, the DVC 202 reads an image from the storage medium 16 by referring to a list of movies to be transmitted stored in the DVC 202, and transmits the read movie to the DVC 201. Then, the DVC 201 receives the movie.

In a case where no chapter of a movie has been selected, the DVC 202 does not perform a transmission process. In this case, the DVC 202 may display, for the user, a warning indicating that no movie has been selected.

Next, a case where the DVC 201 transmits data to the DVC 202 will be explained with reference to FIG. 4. In FIG. 4, parts similar to those in FIG. 3 will not be explained.

A case where the user of the DVC 201 wants to cause the DVC 201 to transmit all the still images stored in the DVC 201 to the DVC 202 will be explained.

In step S307, the user of the DVC 201 presses the Direct Print button of the DVC 201. In response to the pressing of the Direct Print button by the user, the DVC 201 displays, on the display unit 15, a screen 322 indicating that pressing the Direct Print button is associated with a process for transmitting all the still image data.

When the DVC 201 and the DVC 202 are brought into close proximity with each other while the above-described operation is being performed (while the Direct Print button is kept pressed), close proximity wireless communication is established. The DVC 202 determines, in accordance with the operation state of the DVC 201, that the DVC 201 intends to perform the process for transmitting all the still image data, and performs a process for receiving all the still image data. That is, the DVC 201 transmits all the still image data to the DVC 202.

In a case where no still image is recorded in the DVC 201, the DVC 201 does not perform a transmission process. In this case, the DVC 201 may display, for the user, a warning indicating that no still image is recorded in the DVC 201. In addition, even if communication is not established, the DVC 201 may display such a warning at a time when an operating member associated with a process for transmitting data is pressed.

A case where the user of the DVC 201 wants to cause the DVC 201 to transmit all the movies stored in the DVC 201 to the DVC 202 will be explained.

In step S308, the user of the DVC 201 presses the Play button of the DVC 201. In response to the pressing of the Play button by the user, the DVC 201 displays, on the display unit 15, a screen 323 indicating that pressing the Play button is associated with a process for transmitting all the movie data.

When the DVC 201 and the DVC 202 are brought into close proximity with each other while the above-described operation is being performed (while the Play button is kept pressed), close proximity wireless communication is established. The DVC 202 determines, in accordance with the operation state of the DVC 201, that the DVC 201 intends to perform the process for transmitting all the movie data, and performs a process for receiving all the movie data. That is, the DVC 201 transmits all the movie data to the DVC 202.

A case where the user of the DVC 201 wants to cause the DVC 201 to transmit a still image selected from among still images stored in the DVC 201 to the DVC 202 will be explained.

As described above, the user of the DVC 201 is able to select in advance an image to be transmitted.

In step S309, the user of the DVC 201 presses the Rew (rewind) button of the DVC 201. In response to the pressing of the Rew (rewind) button by the user, the DVC 201 displays, on the display unit 15, a screen 324 indicating that pressing the Rew button is associated with a process for transmitting selected still image data.

When the DVC 201 and the DVC 202 are brought into close proximity with each other while the above-described operation is being performed (while the Rew button is kept pressed), close proximity wireless communication is established. The DVC 202 determines, in accordance with the operation state of the DVC 201, that the DVC 201 intends to perform the process for transmitting selected still image data, and performs a process for receiving selected still image data. That is, the DVC 201 transmits selected still image data to the DVC 202. More specifically, the DVC 201 reads an image from the storage medium 16 by referring to a list of still images to be transmitted stored in the DVC 201, and transmits the read image to the DVC 202.

A case where the user of the DVC 201 wants to cause the DVC 201 to transmit a movie selected from among movies stored in the DVC 201 to the DVC 202 will be explained.

As described above, the user of the DVC 201 is able to select in advance a movie to be transmitted.

In step S310, the user of the DVC 201 presses the FF (fast-forward) button of the DVC 201. In response to the pressing of the FF (fast-forward) button by the user, the DVC 201 displays, on the display unit 15, a screen 325 indicating that pressing the FF button is associated with a process for transmitting selected movie data.

When the DVC 201 and the DVC 202 are brought into close proximity with each other while the above-described operation is being performed (while the FF button is kept pressed), close proximity wireless communication is established. The DVC 202 determines, in accordance with the operation state of the DVC 201, that the DVC 201 intends to perform the process for transmitting selected movie data, and performs a process for receiving selected movie data. That is, the DVC 201 transmits selected movie data to the DVC 202. More specifically, the DVC 201 reads a movie from the storage medium 16 by referring to a list of movies to be transmitted stored in the DVC 201, and transmits the read movie to the DVC 202.

In this embodiment, the screens 312 to 315 and 322 to 325 are displayed only during periods in which corresponding operating members are being operated, for example, corresponding buttons are being pressed. When a user's finger is removed from an operating member, the screen 311 or 316 is displayed again. Accordingly, the user of the DVC 201 can easily recognize that the user should bring the DVC 201 into close proximity with the DVC 202 while operating an operating member. In addition, since the user is required to perform a definite operation such as bringing the DVC 201 into close proximity with the DVC 202 while operating an operating member, a situation in which data is unintentionally transmitted when the user unintentionally brings the DVC 201 into close proximity with the DVC 202 can be avoided.

By the above-described processing, it is not necessary for the user to perform a complicated operation for switching between transmission and reception of data or for selecting data to be transmitted or received, thus improving user-friendliness.

FIG. 6 shows an example of a sequence diagram of a data transmission process performed between the DVC 201 and the DVC 202 according to this embodiment. In this example, a case where the DVC 201 transmits all the still image data to the DVC 202 will be explained. However, in other processes shown in FIGS. 3 and 4, basically similar processing is performed.

After communication between the DVC 201 and the DVC 202 is established, in step S601, the DVC 201, which is a transmission side, transmits, to the DVC 202, information on the current operation state of the DVC 201, for example, operation information indicating which operating member is being operated. In addition, the DVC 201 displays a screen 611 indicating the details of a communication process associated with the operating member being operated.

In this embodiment, in a case where it is determined that a state in which an operating member is being operated lasts for a certain period of time after the communication between the DVC 201 and the DVC 202 is established, the DVC 201 may transmit operation information to the DVC 202. This reduces the possibility that the DVC 201 is brought into close proximity with an external apparatus while the user is unintentionally pressing a button and data communication is thus performed. The same applies to other communication processes.

In addition, in this embodiment, in a case where the DVC 201 receives information on the operation state of the DVC 202 before the DVC 201 performs the processing of step S601, the DVC 201 and the DVC 202 are exchanged with each other in the subsequent processing. That is, an apparatus that first transmits information on the operation state thereof to an external apparatus performs the processing shown on the left side of the flowchart of FIG. 6.

After receiving information on the operation state of the DVC 201 in a close proximity wireless communication mode 614, in step S602, the DVC 202 transmits, to the DVC 201, a notification indicating that the information on the operation state of the DVC 201 has been received and information on the operation state of the DVC 202. In a case where the DVC 202 is in the close proximity wireless communication mode, the DVC 202 transmits information on the operation state indicating that no operating member is being operated.

After receiving the notification from the DVC 202, the DVC 201 recognizes, in accordance with the operation state of the DVC 201 and the operation state of the DVC 202, that the DVC 201 is ready to transmit all the still image data to the DVC 202.

In step S603, the DVC 201 transmits, to the DVC 202, a notification indicating that the information on the operation state of the DVC 202 has been received and a notification indicating that the DVC 201 is ready to transmit data.

After receiving from the DVC 201 the notification indicating that data transmission preparation has been completed, the DVC 202 recognizes that data will be transmitted from the DVC 201. Then, the DVC 202 displays, on the display unit 15, a selection screen 615 that allows the user to select whether or not to permit data reception. In a case where the user has selected that data reception should not be permitted, communication between the DVC 201 and the DVC 202 is immediately terminated.

In a case where the user selects that data reception should be permitted, in step S604, the DVC 202 transmits, to the DVC 201, a ready-to-receive notification indicating that the DVC 202 is in a ready-to-receive state. Meanwhile, in a case where the user selects that data reception should not be permitted, the DVC 202 transmits, to the DVC 201, a communication termination notification (not illustrated), and the process is terminated.

After receiving the ready-to-receive notification from the DVC 202, in step S605, the DVC 201 starts a data transmission process associated with the current operation state. In addition, the DVC 201 displays, on the display unit 15 of the DVC 201, a screen 612 indicating that data is being transmitted. Furthermore, the DVC 202 displays, on the display unit 15 of the DVC 202, a screen 616 indicating that data is being received.

After data transmission has been completed, in step S606, the DVC 201 transmits, to the DVC 202, a notification indicating that data transmission has been completed.

After receiving the notification indicating that data transmission from the DVC 201 has been completed and completing data reception, in step S607, the DVC 202 transmits, to the DVC 201, a notification indicating that data reception has been completed. At the same time, the DVC 202 displays, on the display unit 15 of the DVC 202, a reception completion screen 617.

After receiving the notification indicating that data reception by the DVC 202 has been completed, the DVC 201 displays, on the display unit 15 of the DVC 201, a transmission completion screen 613.

Note that in a case where the DVC 201 is in a reception mode, only the direction of data transmission is changed, and the other processing is similar to that described above in this embodiment.

Figure 7:
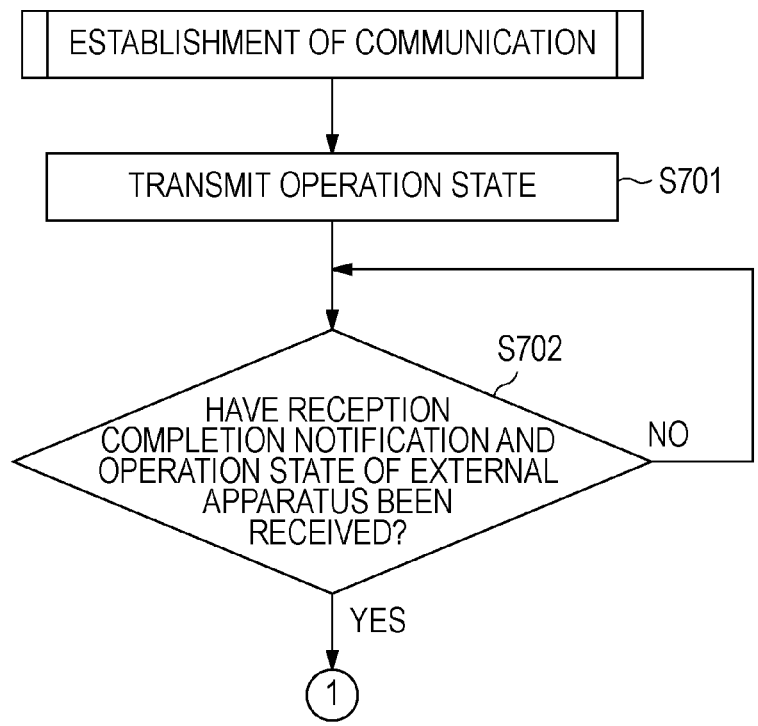
FIG. 7 is a flowchart showing a process performed by a DVC according to the first embodiment.
Figure 8A:
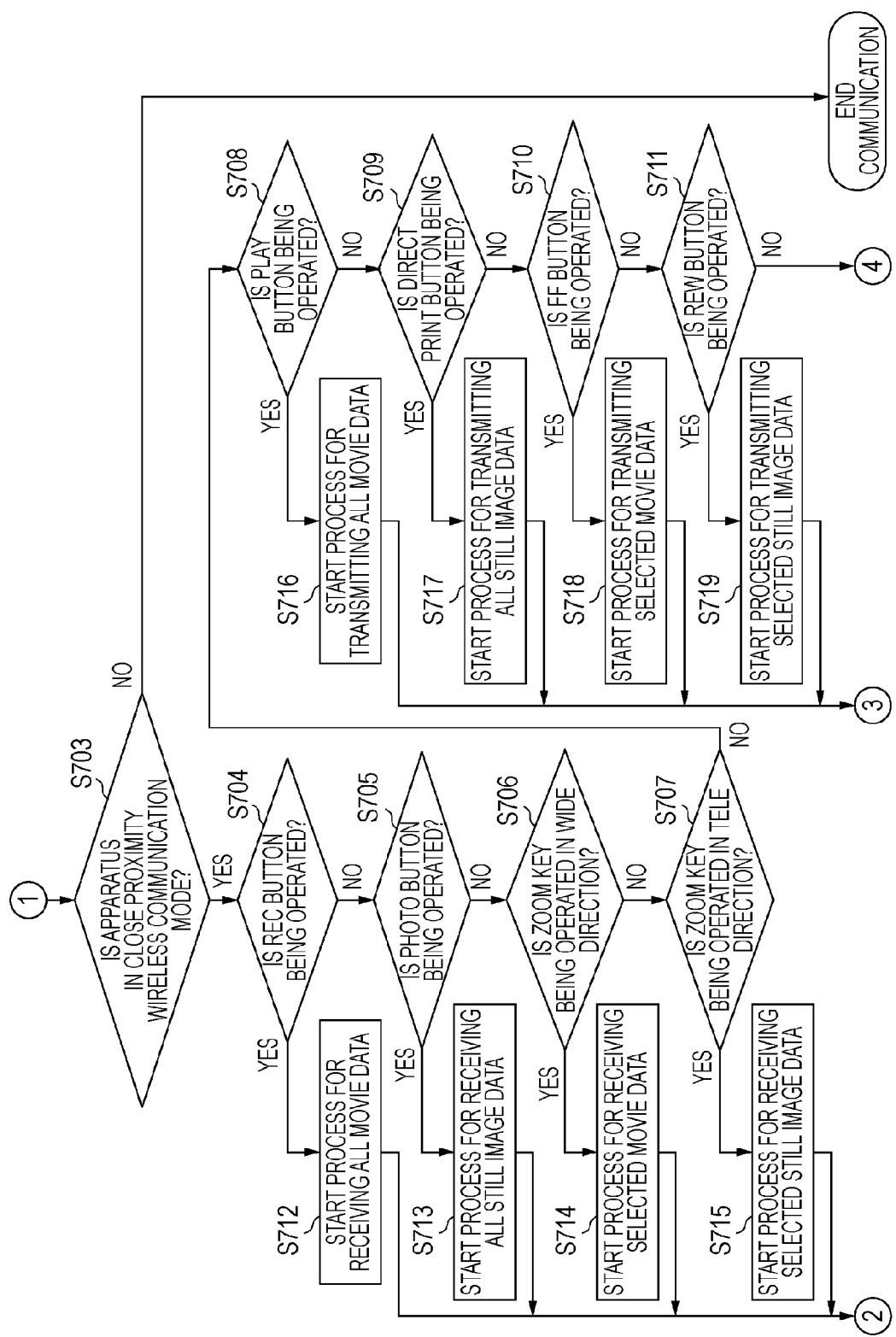
FIG. 8A is a flowchart showing the process performed by the DVC according to the first embodiment.
Figure 8B:
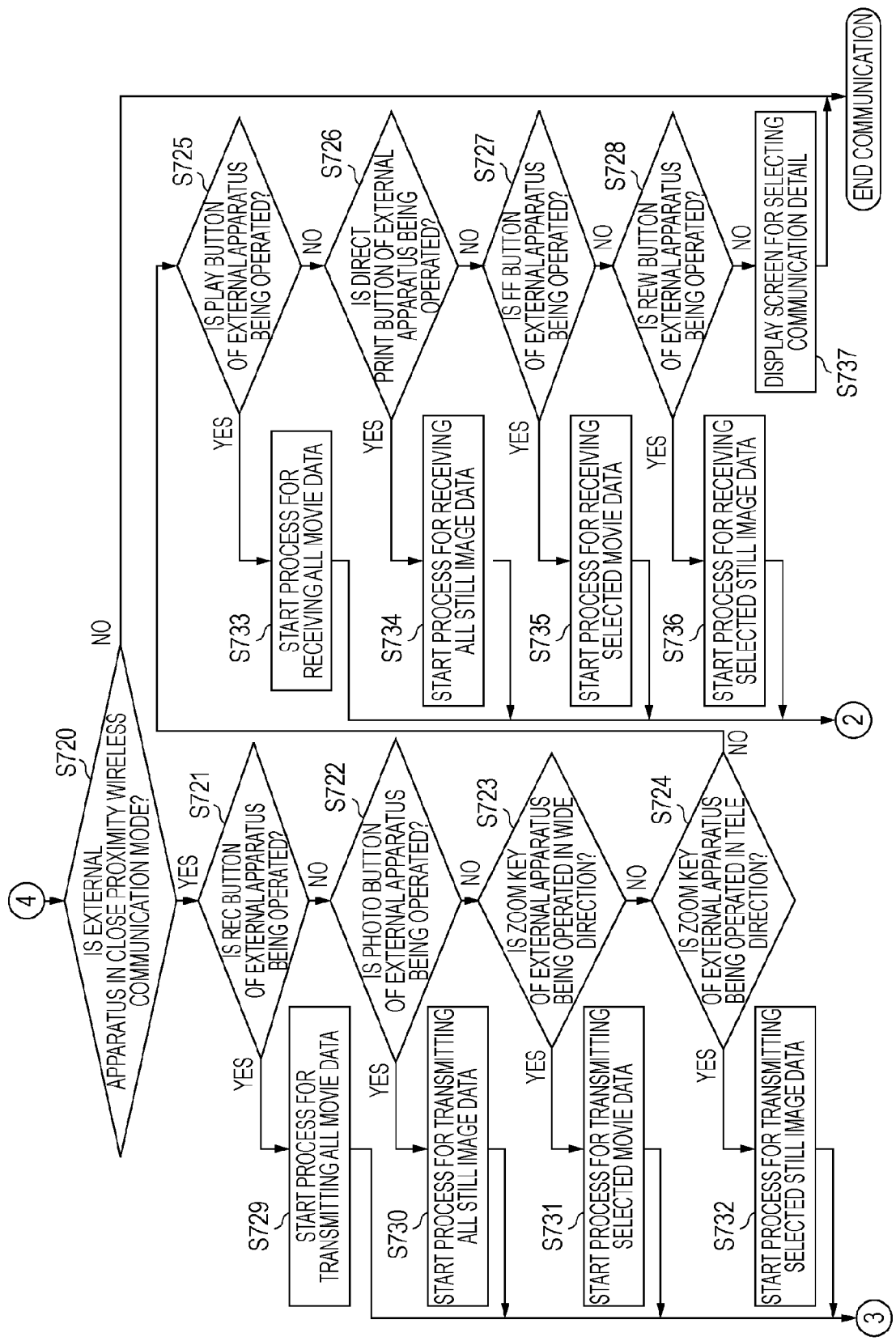
FIG. 8B is a flowchart showing the process performed by the DVC according to the first embodiment.
Figure 9:
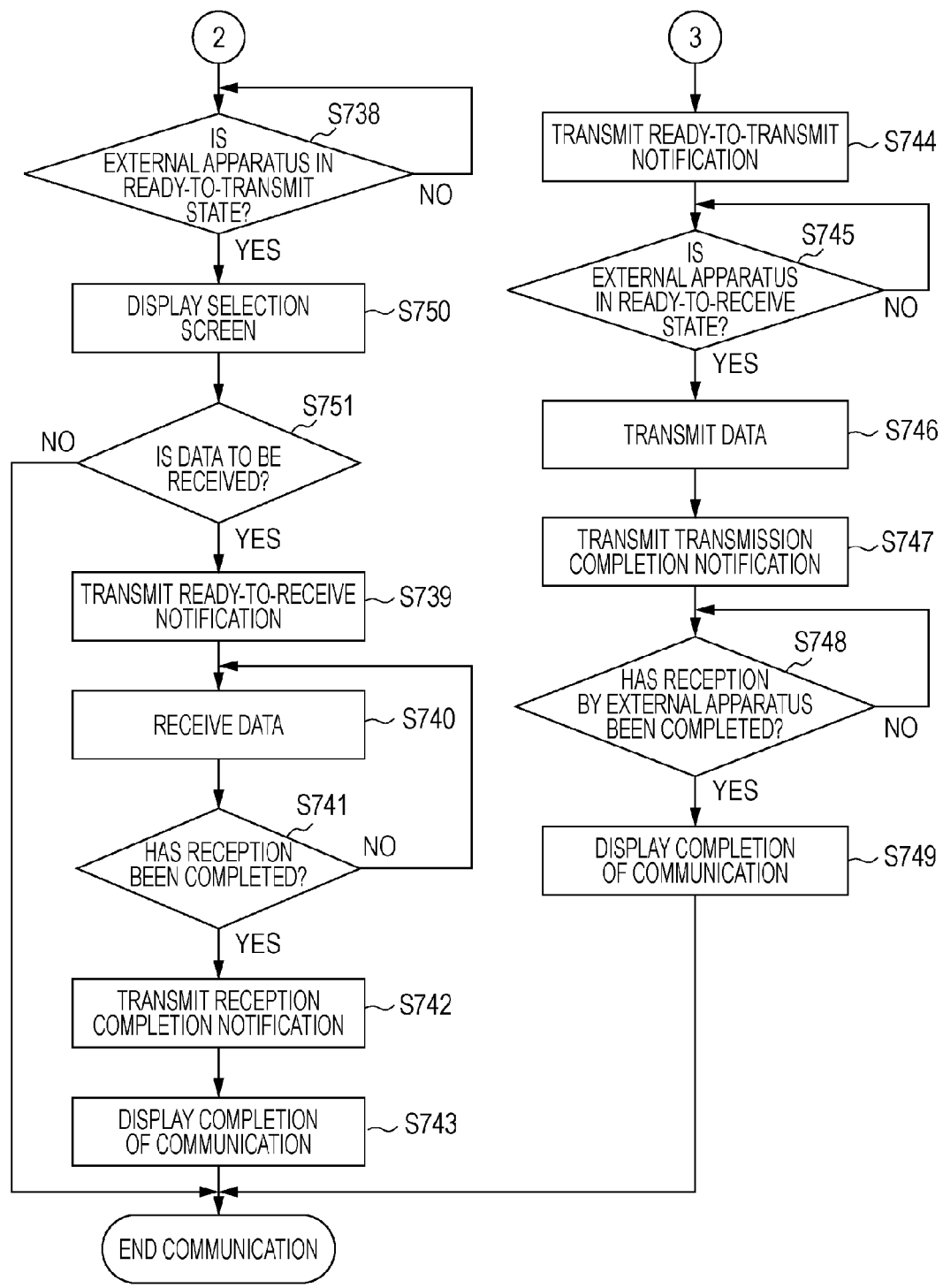
FIG. 9 is a flowchart showing the process performed by the DVC according to the first embodiment.

FIGS. 7 to 9 are flowcharts showing a process performed by the DVC 201 in data communication with the DVC 202. Note that the process is realized when the microcomputer 12 of the DVC 201 controls corresponding units in accordance with input signals and a program.

When communication between the DVC 201 and the DVC 202 is established, in step S701, the DVC 201 transmits, to the DVC 202, the operation state of the DVC 201.

In step S702, the DVC 201 determines whether or not a reception completion notification and the operation state of the DVC 202 have been received from the DVC 202. In a case where the DVC 201 determines that the reception completion notification and the operation state of the DVC 202 have been received (Yes in step S702), the process proceeds to step S703 in FIG. 8A. Meanwhile, in a case where the DVC 201 determines that the reception completion notification and the operation state of the DVC 202 have not been received (No in step S702), the DVC 201 repeats the processing of step S702.

In step S703, the DVC 201 determines whether or not the DVC 201 is in the close proximity wireless communication mode. In a case where the DVC 201 determines that the DVC 201 is in the close proximity wireless communication mode (Yes in step S703), the process proceeds to step S704. Meanwhile, in a case where the DVC 201 determines that the DVC 201 is not in the close proximity wireless communication mode (No in step S703), the process is terminated.

In step S704, the DVC 201 determines whether or not the Rec button is being pressed. In a case where the DVC 201 determines that the Rec button is being pressed (Yes in step S704), the process proceeds to step S712. Meanwhile, in a case where the DVC 201 determines that the Rec button is not being pressed (No in step S704), the process proceeds to step S705.

In step S712, the DVC 201 starts a process for receiving all the movie data, and the process proceeds to step S738 in FIG. 9.

In step S705, the DVC 201 determines whether or not the Photo button is being pressed. In a case where the DVC 201 determines that the Photo button is being pressed (Yes in step S705), the process proceeds to step S713. Meanwhile, in a case where the DVC 201 determines that the Photo button is not being pressed (No in step S705), the process proceeds to step S706.

In step S713, the DVC 201 starts a process for receiving all the still image data, and the process proceeds to step S738 in FIG. 9.

In step S706, the DVC 201 determines whether or not the Zoom key is being operated in the Wide direction. In a case where the DVC 201 determines that the Zoom key is being operated in the Wide direction (Yes in step S706), the process proceeds to step S714. Meanwhile, in a case where the DVC 201 determines that the Zoom key is not being operated in the Wide direction (No in step S706), the process proceeds to step S707.

In step S714, the DVC 201 starts a process for receiving selected movie data, and the process proceeds to step S738 in FIG. 9.

In step S707, the DVC 201 determines whether or not the Zoom key is being operated in the Tele direction. In a case where the DVC 201 determines that the Zoom key is being operated in the Tele direction (Yes in step S707), the process proceeds to step S715. Meanwhile, in a case where it is determined that the Zoom key is not being operated in the Tele direction (No in step S707), the process proceeds to step S708.

In step S715, the DVC 201 starts a process for receiving selected still image data, and the process proceeds to step S738 in FIG. 9.

In step S708, the DVC 201 determines whether or not the Play button is being operated. In a case where the DVC 201 determines that the Play button is being operated (Yes in step S708), the process proceeds to step S716. Meanwhile, in a case where the DVC 201 determines that the Play button is not being operated (No in step S708), the process proceeds to step S709.

In step S716, the DVC 201 starts a process for transmitting all the movie data, and the process proceeds to step S744 in FIG. 9.

In step S709, the DVC 201 determines whether or not the Direct Print button is being operated. In a case where the DVC 201 determines that the Direct Print button is being operated (Yes in step S709), the process proceeds to step S717. Meanwhile, in a case where the DVC 201 determines that the Direct Print button is not being operated (No in step S709), the process proceeds to step S710.

In step S717, the DVC 201 starts a process for transmitting all the still image data, and the process proceeds to step S744 in FIG. 9.

In step S710, the DVC 201 determines whether or not the FF (fast-forward) button is being operated. In a case where the DVC 201 determines that the FF (fast-forward) button is being operated (Yes in step S710), the process proceeds to step S718. Meanwhile, in a case where the DVC 201 determines that the FF (fast-forward) button is not being operated (No in step S710), the process proceeds to step S711.

In step S718, the DVC 201 starts a process for transmitting selected movie data, and the process proceeds to step S744 in FIG. 9.

In step S711, the DVC 201 determines whether or not the Rew (rewind) button is being operated. In a case where the DVC 201 determines that the Rew (rewind) button is being operated (Yes in step S711), the process proceeds to step S719. Meanwhile, in a case where the DVC 201 determines that the Rew (rewind) button is not being operated (No in step S711), the process proceeds to step S720.

In step S719, the DVC 201 starts a process for transmitting selected still image data, and the process proceeds to step S744 in FIG. 9.

A case where it is determined in step S711 that the Rew (rewind) button is not being operated will be explained below. In this case, an operating member for specifying a communication process is not being operated. Thus, in the following processing, it is determined whether or not a communication process is specified on the DVC 202 side, and the state of the DVC 201 is determined so as to correspond to the state of the DVC 202.

In step S720, the DVC 201 refers to information on the operation state of the DVC 202 received from the DVC 202, and determines whether or not the DVC 202 is in the close proximity wireless communication mode. In a case where the DVC 201 determines that the DVC 202 is in the close proximity wireless communication mode (Yes in step S720), the process proceeds to step S721. Meanwhile, in a case where the DVC 201 determines that the DVC 202 is not in the close proximity wireless communication mode (No in step S720), the process is terminated.

In step S721, the DVC 201 determines that the Rec button of the DVC 202 is being operated. In a case where the DVC 201 determines that the Rec button of the DVC 202 is being operated (Yes in step S721), the process proceeds to step S729. Meanwhile, in a case where the DVC 201 determines that the Rec button of the DVC 202 is not being operated (No in step S721), the process proceeds to step S722.

In step S729, the DVC 201 prepares for transmission of all the movie data. After the transmission preparation is completed, the process proceeds to step S744 in FIG. 9.

In step S722, the DVC 201 determines whether or not the Photo button of the DVC 202 is being operated. In a case where the DVC 201 determines that the Photo button of the DVC 202 is being operated (Yes in step S722), the process proceeds to step S730. Meanwhile, in a case where the DVC 201 determines that the Photo button of the DVC 202 is not being operated (No in step S722), the process proceeds to step S723.

In step S730, the DVC 201 prepares for transmission of all the still image data. After the transmission preparation is completed, the process proceeds to step S744 in FIG. 9.

In step S723, the DVC 201 determines whether or not the Zoom key of the DVC 202 is being operated in the Wide direction. In a case where the DVC 201 determines that the Zoom key of the DVC 202 is being operated in the Wide direction (Yes in step S723), the process proceeds to step S731. Meanwhile, in a case where the DVC 201 determines that the Zoom key of the DVC 202 is not being operated (No in step S723), the process proceeds to step S724.

In step S731, the DVC 201 prepares for transmission of selected movie data. After the transmission preparation is completed, the process proceeds to step S744 in FIG. 9.

In step S724, the DVC 201 determines whether or not the Zoom key of the DVC 202 is being operated in the Tele direction. In a case where the DVC 201 determines that the Zoom key of the DVC 202 is being operated in the Tele direction (Yes in step S724), the process proceeds to step S732. Meanwhile, in a case where the DVC 201 determines that the Zoom key of the DVC 202 is not being operated in the Tele direction (No in step S724), the process proceeds to step S725.

In step 732, the DVC 201 prepares for transmission of selected still image data. After the transmission preparation is completed, the process proceeds to step S744 in FIG. 9.

In step S725, the DVC 201 determines whether or not the Play button of the DVC 202 is being operated. In a case where the DVC 201 determines that the Play button of the DVC 202 is being operated (Yes in step S725), the process proceeds to step S733. Meanwhile, in a case where the DVC 201 determines that the Play button of the DVC 202 is not being operated (No in step S725), the process proceeds to step S726.

In step S733, the DVC 201 prepares for reception of all the movie data. After the reception preparation is completed, the process proceeds to step S738 in FIG. 9.

In step S726, the DVC 201 determines whether or not the Direct Print button of the DVC 202 is being operated. In a case where the DVC 201 determines that the Direct Print button of the DVC 202 is being operated (Yes in step S726), the process proceeds to step S734. Meanwhile, in a case where the DVC 201 determines that the Direct Print button of the DVC 202 is not being operated (No in step S726), the process proceeds to step S727.

In step S734, the DVC 201 prepares for reception of all the still image data. After the reception preparation is completed, the process proceeds to step S738 in FIG. 9.

In step S727, the DVC 201 determines whether or not the FF (fast-forward) button of the DVC 202 is being operated. In a case where the DVC 201 determines that the FF (fast-forward) button of the DVC 202 is being operated (Yes in step S727), the process proceeds to step S735. Meanwhile, in a case where the DVC 201 determines that the FF (fast-forward) button of the DVC 202 is not being operated (No in step S727), the process proceeds to step S728.

In step S735, the DVC 201 prepares for reception of selected movie data. After the reception preparation is completed, the process proceeds to step S738 in FIG. 9.

In step S728, the DVC 201 determines whether or not the Rew (rewind) button of the DVC 202 is being operated. In a case where the DVC 201 determines that the Rew (rewind) button of the DVC 202 is being operated (Yes in step S728), the process proceeds to step S736. Meanwhile, in a case where the DVC 201 determines that the Rew (rewind) button of the DVC 202 is not being operated (No in step S728), the process proceeds to step S737.

In step S736, the DVC 201 prepares for reception of selected still image data. After the reception preparation is completed, the process proceeds to step S738 in FIG. 9.

In a case where it is determined in step S728 that the Rew (rewind) button of the DVC 202 is not being operated (No in step S728), no communication process is specified on the DVC 202 side. That is, none of the DVC 201 and the DVC 202 specify a communication process.

Thus, in step S737, the DVC 201 displays, on the display unit 15, a selection screen on which a list of communication processes is displayed, so that the user can select a desired communication process. When a communication process is selected in accordance with a user operation, the DVC 201 performs a process corresponding to the selection. Obviously, the DVC 202 can also display such a selection screen.

As described above, the transmission preparation or the reception preparation of the DVC 201 is performed. The subsequent processing will be explained with reference to FIG. 9.

In a case where the DVC 201 receives data, in step S738, the DVC 201 determines whether or not the DVC 202 is in a ready-to-transmit state. More specifically, the DVC 201 determines whether or not a ready-to-transmit notification transmitted from the DVC 202 has been received. In a case where the DVC 201 determines that the DVC 202 is in the ready-to-transmit state (Yes in step S738), the process proceeds to step S750. Meanwhile, in a case where the DVC 201 determines that the DVC 202 is not in the ready-to-transmit state (No in step S738), the processing of step S738 is repeated.

In step S750, the DVC 201 displays, on the display unit 15, the selection screen 615 shown in FIG. 6. On the selection screen, a message indicating that a data reception request from the DVC 201 has been received and icons (YES and NO) that allow the user to select whether or not data should be received from the DVC 201 are displayed.

In step S751, the DVC 201 determines whether or not permission for data reception has been selected by the user. In a case where it is determined that the permission for data reception has been selected (Yes in step S751), the process proceeds to step S739. Meanwhile, in a case where it is determined that the permission for data reception has not been selected, that is, data reception is inhibited (No in step S751), the process is terminated.

In step S739, the DVC 201 transmits a ready-to-receive notification to the DVC 202. When the DVC 202 receives the ready-to-receive notification, which is a preparation completion notification, the DVC 202 transmits data to the DVC 201.

In step S740, the DVC 201 receives the data transmitted from the DVC 202.

In step S741, the DVC 201 receives a transmission completion notification from the DVC 202, and determines whether or not all the data have been received. In a case where it is determined that all the data have been received (Yes in step S741), the process proceeds to step S742. Meanwhile, in a case where it is determined that all the data have not been received (No in step S741), the process returns to step S740.

In step S742, the DVC 201 transmits a reception completion notification to the DVC 202.

After transmitting the reception completion notification to the DVC 202, in step S743, the DVC 201 displays, on the display unit 15, a message indicating that communication has been completed. The case where the DVC 201 receives data from the DVC 202 has been described above.

Next, a case where the DVC 201 transmits data to the DVC 202 will be explained.

In step S744, the DVC 201 transmits a ready-to-transmit notification to the DVC 202.

In step S745, the DVC 201 determines whether or not the DVC 202 is in a ready-to-receive state. More specifically, the DVC 201 determines whether or not a ready-to-receive notification transmitted from the DVC 202 has been received. In a case where the DVC 201 determines that the DVC 202 is in the ready-to-receive state (Yes in step S745), the process proceeds to step S746. Meanwhile, in a case where the DVC 201 determines that the DVC 202 is not in the ready-to-receive state (No in step S745), the processing of step S745 is repeated.

In step S746, the DVC 201 transmits data to the DVC 202.

After all the data have been transmitted, in step S747, the DVC 201 transmits a transmission completion notification to the DVC 202.

In step S748, the DVC 201 determines whether or not a reception completion notification has been received from the DVC 202. After receiving a reception completion notification from the DVC 202, in step S749, the DVC 201 displays a message indicating that communication has been completed.

As described above, it is not necessary for the user to perform a complicated operation for switching between transmission and reception of data or for selecting data to be transmitted or received, thus reducing the burden placed on the user.

In addition, for transmission or reception, a screen that allows the user to select permission or inhibition is displayed, so that a transmission or reception process can be performed only in a case where permission for the process is selected by the user. Thus, a situation in which communication that is not desired by the user is unintentionally performed can be prevented. Note that such a screen is not necessary. When apparatuses are brought into close proximity with each other, data may be automatically transmitted and received, without a particular user selection.

In this embodiment, by transmitting the operation state of a DVC to an another DVC with which communication is performed, a communication process to be performed is determined. However, the operation state is not necessarily transmitted. A DVC may transmit the details of a communication process to be performed to another DVC with which communication is performed, in accordance with an operating member being operated. In this case, the other DVC determines a communication process to be performed, in accordance with an operating member being operated on the other DVC side and the details of the communication process transmitted from the DVC.

Second Embodiment

In the first embodiment, a method for determining a communication process by bringing a DVC whose operating member is being operated into close proximity with another DVC in a close proximity wireless communication mode has been described. In this embodiment, a method for determining a communication process by performing close proximity wireless communication while operating members of both the DVCs are being operated will be described.

Many parts of this embodiment are similar to those in the first embodiment. Hence, those similar parts will not be explained. Parts specific to this embodiment will be mainly explained.

Figure 10:
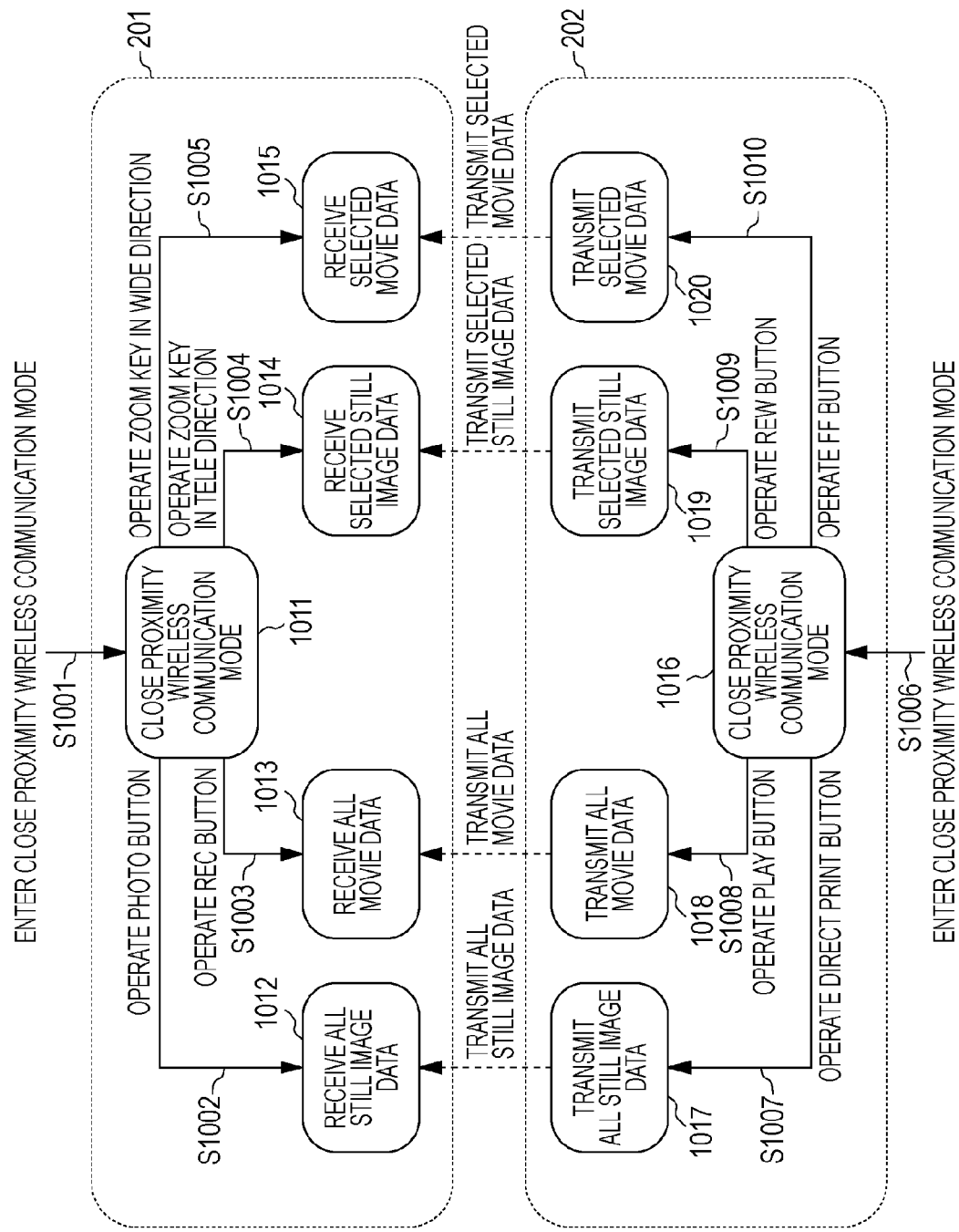
FIG. 10 illustrates the transition of the states of DVCs according to a second embodiment.

FIG. 10 illustrates the details of unidirectional data communication (transmission/reception) between the DVC 201 and the DVC 202 according to this embodiment.

Hereinafter, a case where operating members of both the DVC 201 and the DVC 202 in the close proximity wireless communication mode are operated will be explained.

A case where users of the DVC 201 and the DVC 202 want to cause the DVC 202 to transmit all the still images stored in the DVC 202 to the DVC 201 will be explained. In step S1001, the DVC 201 enters the close proximity wireless communication mode, and a close proximity wireless communication mode screen 1011 is displayed.

In this case, in step 1002, the user of the DVC 201 presses the Photo button of the DVC 201. In response to the pressing of the Photo button by the user, the DVC 201 displays, on the display unit 15, a screen 1012 indicating that pressing the Photo button is associated with a process for receiving all the still image data.

Next, an operation of the DVC 202 will be explained. In step S1006, the DVC 202 enters the close proximity wireless communication mode, and a close proximity wireless communication mode screen 1016 is displayed. In step S1007, the user of the DVC 202 presses the Direct Print button of the DVC 202. In response to the pressing of the Direct Print button by the user, the DVC 202 displays, on the display unit 15, a screen 1017 indicating that pressing the Direct Print button is associated with a process for transmitting all the still image data.

When the DVC 201 and the DVC 202 are brought into close proximity with each other while the above-described operations are performed (while the Photo button and the Direct Print button are kept pressed) on the DVC 201 side and the DVC 202 side and close proximity wireless communication is established, the DVC 202 transmits all the still image data to the DVC 201.

In a case where no still image is recorded in the DVC 202, the DVC 202 does not perform a transmission process. In this case, the DVC 202 may display, for the users, a warning indicating that no still image is recorded in the DVC 202.

A case where the users of the DVC 201 and the DVC 202 want to cause the DVC 202 to transmit all the movies stored in the DVC 202 to the DVC 201 will be explained.

In step S1003, the user of the DVC 201 presses the Rec button of the DVC 201. In response to the pressing of the Rec button by the user, the DVC 201 displays, on the display unit 15, a screen 1013 indicating that pressing the Rec button is associated with a process for receiving all the movie data.

Next, an operation of the DVC 202 will be explained. In step S1008, the user of the DVC 202 presses the Play button of the DVC 202. In response to the pressing of the Play button by the user, the DVC 202 displays, on the display unit 15, a screen 1018 indicating that pressing the Play button is associated with a process for transmitting all the movie data.

When the DVC 201 and the DVC 202 are brought into close proximity with each other while the above-described operations are being performed (while the Rec button and the Play button are kept pressed) on the DVC 201 side and the DVC 202 side and close proximity wireless communication is established, the DVC 202 transmits all the movie data to the DVC 201.

In a case where no movie is recorded in the DVC 202, the DVC 202 does not perform a transmission process. In this case, the DVC 202 may display, for the users, a warning indicating that no movie is recorded in the DVC 202.

When close proximity wireless communication is established while the above-described operations are being performed on the DVC 201 side and the DVC 202 side, the DVC 202 transmits all the movie data to the DVC 201. In a case where no chapter of a movie is recorded in the DVC 202, the DVC 202 does not perform a transmission process. Here, the DVC 202 may display, for the users, a warning indicating that no movie is recorded in the DVC 202.

A case where the users of the DVC 201 and the DVC 202 want to cause the DVC 202 to transmit a still image selected from among still images stored in the DVC 202 to the DVC 201 will be explained.

First, a method for selecting an image to be transmitted will be explained. Prior to starting of communication with the DVC 201, the user of the DVC 202 is able to select in advance an image to be transmitted. For example, the DVC 202 displays a list of images on the display unit 15, so that the user can select a desired image. After selection is completed, the DVC 202 makes a list of identification information including the file name of the selected image, and stores the list in the ROM 17. Accordingly, an image to be transmitted can be selected in advance.

Referring back to FIG. 10, in step S1004, the user of the DVC 201 operates the Zoom key in the Tele direction. In response to the operation of the Zoom key in the Tele direction by the user, the DVC 201 displays, on the display unit 15, a screen 1014 indicating that operating the Zoom key in the Tele direction is associated with a process for receiving selected still image data.

Next, an operation of the DVC 202 will be explained. In step S1009, the user of the DVC 202 presses the Rew (rewind) button of the DVC 202. In response to the pressing of the Rew (rewind) button by the user, the DVC 202 displays, on the display unit 15, a screen 1019 indicating that pressing the Rew (rewind) button is associated with a process for transmitting selected still image data.

When close proximity wireless communication is established while the above-described operations are being performed on the DVC 201 side and the DVC 202 side, the DVC 202 transmits selected still image data to the DVC 201. More specifically, the DVC 202 reads an image from the storage medium 16 by referring to a list of still images to be transmitted stored in the DVC 202, and transmits the read image to the DVC 201.

In a case where no still image has been selected, the DVC 202 does not perform a transmission process. In this case, the DVC 202 may display, for the users, a warning indicating that no still image has been selected.

A case where the users of the DVC 201 and the DVC 202 want to cause the DVC 202 to transmit a movie selected from among movies stored in the DVC 202 to the DVC 201 will be explained. A method for selecting a movie to be transmitted is similar to the method for selecting a still image to be transmitted.

In step S1005, the user of the DVC 201 operates the Zoom key in the Wide direction. In response to the operation of the Zoom key in the Wide direction by the user, the DVC 201 displays, on the display unit 15, a screen 1015 indicating that operating the Zoom key in the Wide direction is associated with a process for receiving selected movie data.

Next, an operation of the DVC 202 will be explained. In step S1010, the user of the DVC 202 presses the FF (fast-forward) button of the DVC 202. In response to the pressing of the FF (fast-forward) button by the user, the DVC 202 displays, on the display unit 15, a screen 1020 indicating that pressing the FF (fast-forward) button is associated with a process for transmitting selected movie data.

When close proximity wireless communication is established while the above-described operations are being performed on the DVC 201 side and the DVC 202 side, the DVC 202 transmits selected movie data to the DVC 201.

In this embodiment, the screens 1012 to 1015 and 1017 to 1020 are displayed only during periods in which corresponding operating members are being operated, for example, corresponding buttons are being pressed. When a user's finger is removed from an operating member, the screen 1011 or 1016 is displayed again. Accordingly, users can easily recognize that apparatuses should be brought into close proximity with each other while operating members are being operated.

According to this embodiment, since operations on both the DVC 201 and the DVC 202 are necessary in order to realize a communication process, a process that reflects users' intentions more reliably can be performed.

In addition, by simply bringing apparatuses into close proximity with each other while operating members of both the apparatuses are being operated, a desired communication process can be performed. Hence, there is no need to perform an operation to determine permission or inhibition after the apparatuses are brought into close proximity with each other. Thus, user-friendliness can be improved.

Other Embodiments

The embodiments described above are merely embodiments of the present invention and the embodiments described above may be combined in an appropriate manner.

In addition, although a case where a DVC is used as a communication apparatus has been explained above, the present invention is also applicable to a digital still camera, a cellular phone, an image viewer, or the like. In addition, data, such as personal data, telephone directory data, mail data, music data, application data, or the like stored in a cellular phone or the like may be handled. It is obvious that a simple user operation can be realized without requiring a user to perform a complicated operation for switching between transmission and reception or for selecting data to be transmitted or received.

In addition, it is obvious that an aspect of the present invention can be attained by programming functions of a DVC according to the foregoing embodiments, writing in advance the program in a storage medium such as a ROM, installing the ROM into the DVC, and executing the program.

In this case, a state in which the program is read from the ROM and executed realizes the functions of the foregoing embodiments, and the program and the ROM having the program recorded therein also constitute the present invention.

A program implementing functions of a DVC according to the foregoing embodiments may be supplied in a state in which the program is stored in a storage medium. The storage medium is, for example, a semiconductor medium, such as a ROM or a nonvolatile memory, an optical medium, such as a digital versatile disc (DVD), a magneto-optical (MO) disk, a mini disc (MD), or a compact disc (CD), or a magnetic medium, such as a magnetic tape or a flexible disk. Alternatively, by receiving from a server computer the program stored in a storage device through a communication line, such as a network, the program may be received.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures and functions.

This application claims the benefit of Japanese Patent Application No. 2008-163638, filed Jun. 23, 2008, which is hereby incorporated by reference herein in its entirety.

The invention claimed is:

1. A communication apparatus comprising:
    a close proximity wireless communication unit configured to perform non-contact communication when the communication apparatus and an external apparatus are brought into close proximity with each other within a predetermined range;
    a plurality of operating units;
    a storing unit configured to store information on the plurality of operating units and information on communication processes to be performed by the communication apparatus, in association with each other; and
    a control unit configured to control the close proximity wireless communication unit to perform, in a case where a state of the communication apparatus changes from a first state to a second state, a communication process that is associated with the one of the plurality of operating units of the communication apparatus that is being operated when communication with the external apparatus is established,
    wherein the first state is a state that the one of the plurality of operating units of the communication apparatus is kept operated and the communication with the external apparatus is not established, and the second state is a state that the one of the plurality of operating units of the communication apparatus is kept operated continuing from the first state and the communication with the external apparatus is established.

2. The communication apparatus according to claim 1, wherein the control unit determines, in accordance with the one of the plurality of operating units of the communication apparatus that is being operated when the state of the communication apparatus changes from the first state to the second state, whether to control the communication apparatus to transmit data to the external apparatus or to control the communication apparatus to receive data from the external apparatus.

3. The communication apparatus according to claim 1,
    wherein the close proximity wireless communication unit further receives, from the external apparatus, operation information indicating which one of a plurality of operating units of the external apparatus is being operated, and
    wherein the control unit controls data transmission and reception by the close proximity wireless communication unit, in accordance with the one of the plurality of operating units of the communication apparatus that is being operated when the state of the communication apparatus changes from the first state to the second state and the operation information received from the external apparatus.

4. The communication apparatus according to claim 3, wherein in a case where the state of the communication apparatus changes from the first state to the second state, one of the plurality of operating units of the communication apparatus that is associated with a communication process is kept operated and the operation information received from the external apparatus indicates that none of the plurality of operating units of the external apparatus is being operated, the control unit performs control in such a manner that the communication apparatus performs the communication process associated with the one of the plurality of operating units of the communication apparatus that is being operated.

5. The communication apparatus according to claim 3, wherein in a case where the state of the communication apparatus changes from the first state to the second state, none of the plurality of operating units of the communication apparatus is kept operated and the operation information received from the external apparatus is associated with a data transmission process, the control unit performs control in such a manner that the communication apparatus performs a process for receiving data from the external apparatus.

6. The communication apparatus according to claim 5, wherein prior to starting of the process for receiving data from the external apparatus, the communication apparatus receives a selection of whether to permit or inhibit reception of data from the external apparatus.

7. The communication apparatus according to claim 3, wherein in a case where the state of the communication apparatus changes from the first state to the second state, one of the plurality of operating units of the communication apparatus that is associated with a process for transmitting data to the external apparatus is kept operated and the operation information received from the external apparatus indicates that one of the plurality of operating units of the external apparatus that is associated with a process for receiving data is being operated, the control unit causes the communication apparatus to transmit data to the external apparatus.

8. The communication apparatus according to claim 3, wherein in a case where the state of the communication apparatus changes from the first state to the second state, one of the plurality of operating units of the communication apparatus that is associated with a process for receiving data from the external apparatus is kept operated and the operation information received from the external apparatus indicates that one of the plurality of operating units of the external apparatus that is associated with a process for transmitting data is being operated, the control unit causes the communication apparatus to receive data from the external apparatus.

9. The communication apparatus according to claim 3, wherein in a case where the state of the communication apparatus changes from the first state to the second state, none of the plurality of operating units of the communication apparatus is kept operated and the operation information received from the external apparatus indicates that none of the plurality of operating units of the external apparatus is being operated, the communication unit receives a selection of a communication process by a user.

10. The communication apparatus according to claim 1, further comprising a display unit configured to display details of the communication process associated with the one of the plurality of operating units that is being operated.

11. The communication apparatus according to claim 10, wherein the display unit displays the details of the communication process during a period in which the one of the plurality of operating units that is associated with the communication process is kept operated.

12. The communication apparatus according to claim 1, wherein the storing unit stores information on a process for transmitting or receiving all the data stored in a storage medium of the communication apparatus and information on a process for transmitting or receiving part of the data stored in the storage medium of the communication apparatus, in association with different operating units.

13. The communication apparatus according to claim 1, wherein the storing unit stores information on a process for transmitting or receiving still image data of data stored in a storage medium of the communication apparatus and information on a process for transmitting or receiving movie data of the data stored in the storage medium of the communication apparatus, in association with different operating units.

14. The communication apparatus according to claim 1, further comprising:
   a storage unit configured to store contents data;
   wherein the each information on the plurality of the operating units is further associated individually with information of a process regarding reproduction of the contents data.

15. The communication apparatus according to claim 14, wherein the process regarding reproduction of the contents data that is associated with the one of the plurality of operating units of the communication apparatus that is being operated when the state of the communication apparatus changes from the first state to the second state, is not executed in a case where the control unit controls the close proximity wireless communication unit so as to perform a communication process that is associated with the one of the plurality of operating units of the communication apparatus that is being operated when communication with the external apparatus changes to be established from not being established when the state of the communication apparatus changes from the first state to the second state.

16. The communication apparatus according to claim 14, further comprising:
   a generation unit configured to generate the contents data;
   wherein the storage unit stores the contents data generated by the generation unit.

17. The communication apparatus according to claim 1, further comprising:
   a generation unit configured to generate the contents data;
   wherein the each information on the plurality of the operating units is further associated individually with information of a process regarding generation of the contents data.

18. The communication apparatus according to claim 17, wherein the process regarding generation of the contents data that is associated with the one of the plurality of operating units of the communication apparatus that is being operated when the state of the communication apparatus changes from the first state to the second state, is not executed in a case where the control unit controls the close proximity wireless communication unit so as to perform a communication process that is associated with the one of the plurality of operating units of the communication apparatus that is being operated when communication with the external apparatus changes to be established from not being established when the state of the communication apparatus changes from the first state to the second state.

19. The communication apparatus according to claim 17, wherein the generation unit includes an image capturing unit and the contents data is the image data.

20. The communication apparatus according to claim 1, wherein the communication apparatus has a close proximity wireless communication mode capable of controlling the close proximity wireless communication unit so that the control unit to perform the communication process that is associated with the one of the plurality of operating units of the communication apparatus that is being operated when a condition of communication with the external apparatus changes to be established from not being established, and wherein the communication apparatus enters the close proximity wireless communication mode according to a condition when a power of the communication apparatus becomes power-on state.

21. The communication apparatus according to claim 1, wherein the control unit is configured to control the close proximity wireless communication unit to perform a communication process that is associated with the one of the plurality of operating units of the communication apparatus that is being operated when a condition of communication with the external apparatus changes to be established from not being established, in a case where an operation of the operation unit is kept operated for a predetermined period after the state of the communication apparatus changes from the first state to the second state.

22. A method for controlling a communication apparatus, comprising the steps of:
performing close proximity wireless communication when the communication apparatus and an external apparatus are brought into close proximity with each other within a predetermined range;
storing information on a plurality of operating units included in the communication apparatus and information on communication processes to be performed through the close proximity wireless communication, in association with each other; and
performing, in a case where a state of the communication apparatus changes from a first state to a second state, the communication process that is associated with the one of the plurality of operating units of the communication apparatus that is being operated when communication with the external apparatus is established,
wherein the first state is a state that the one of the plurality of operating units of the communication apparatus is kept operated and the communication with the external apparatus is not established, and the second state is a state that the one of the plurality of operating units of the communication apparatus is kept operated continuing from the first state and the communication with the external apparatus is established.

23. A storage medium in which is stored a computer-readable program implementing a method for controlling a communication apparatus, the method comprising the steps of:
performing close proximity wireless communication when the communication apparatus and an external apparatus are brought into close proximity with each other within a predetermined range;
storing information on a plurality of operating units included in the communication apparatus and information on communication processes to be performed through the close proximity wireless communication, in association with each other; and
performing, in a case where a state of the communication apparatus changes from a first state to a second state, a communication process that is associated with the one of the plurality of operating units of the communication apparatus that is being operated when communication with the external apparatus is established,
wherein the first state is a state that the one of the plurality of operating units of the communication apparatus is kept operated and the communication with the external apparatus is not established, and the second state is a state that the one of the plurality of operating units of the communication apparatus is kept operated continuing from the first state and the communication with the external apparatus is established.

* * * * *